Dec. 7, 1937. B. M. OFFUTT 2,101,686
SERVICE TRAY
Filed May 17, 1935 3 Sheets-Sheet 2
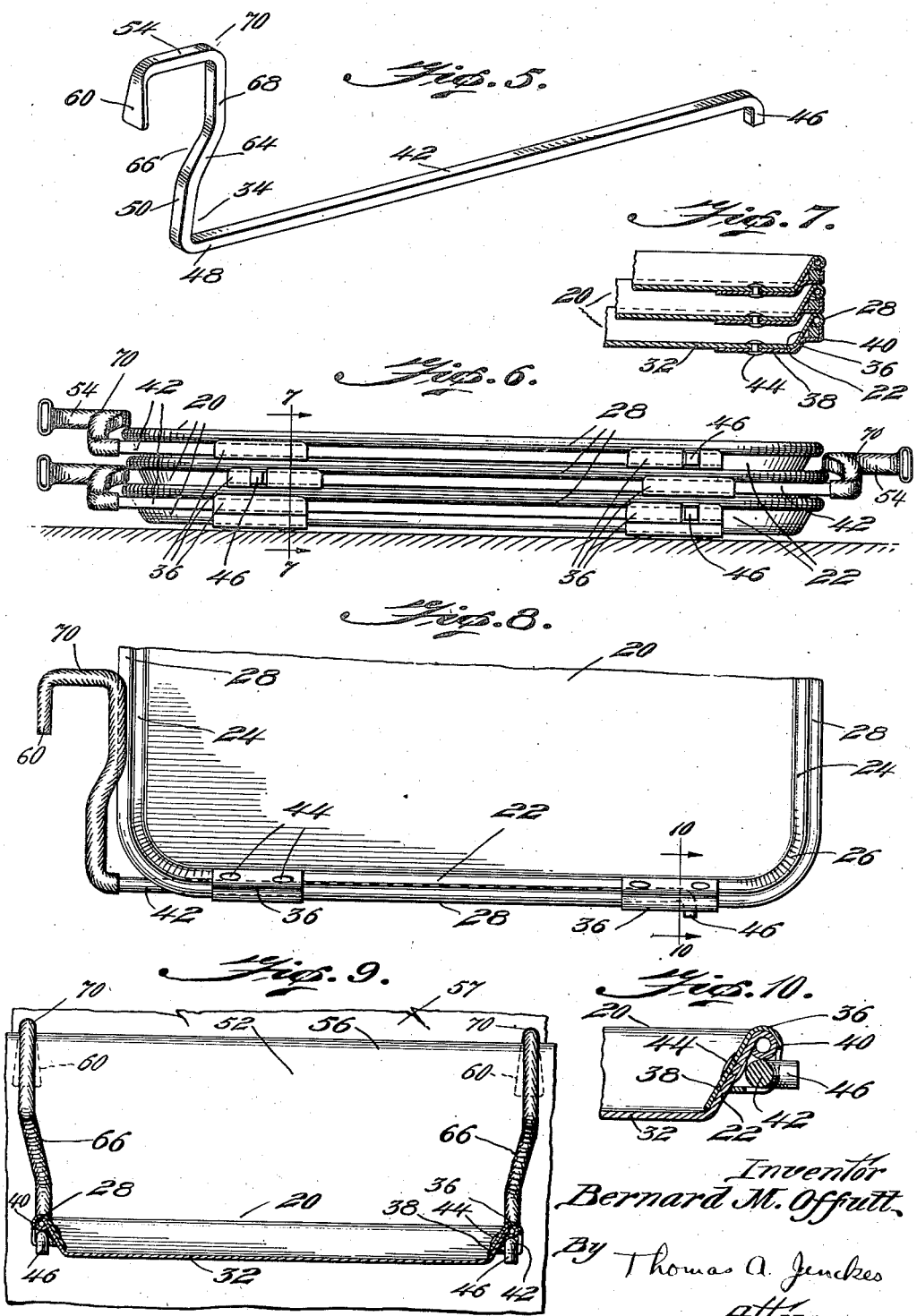

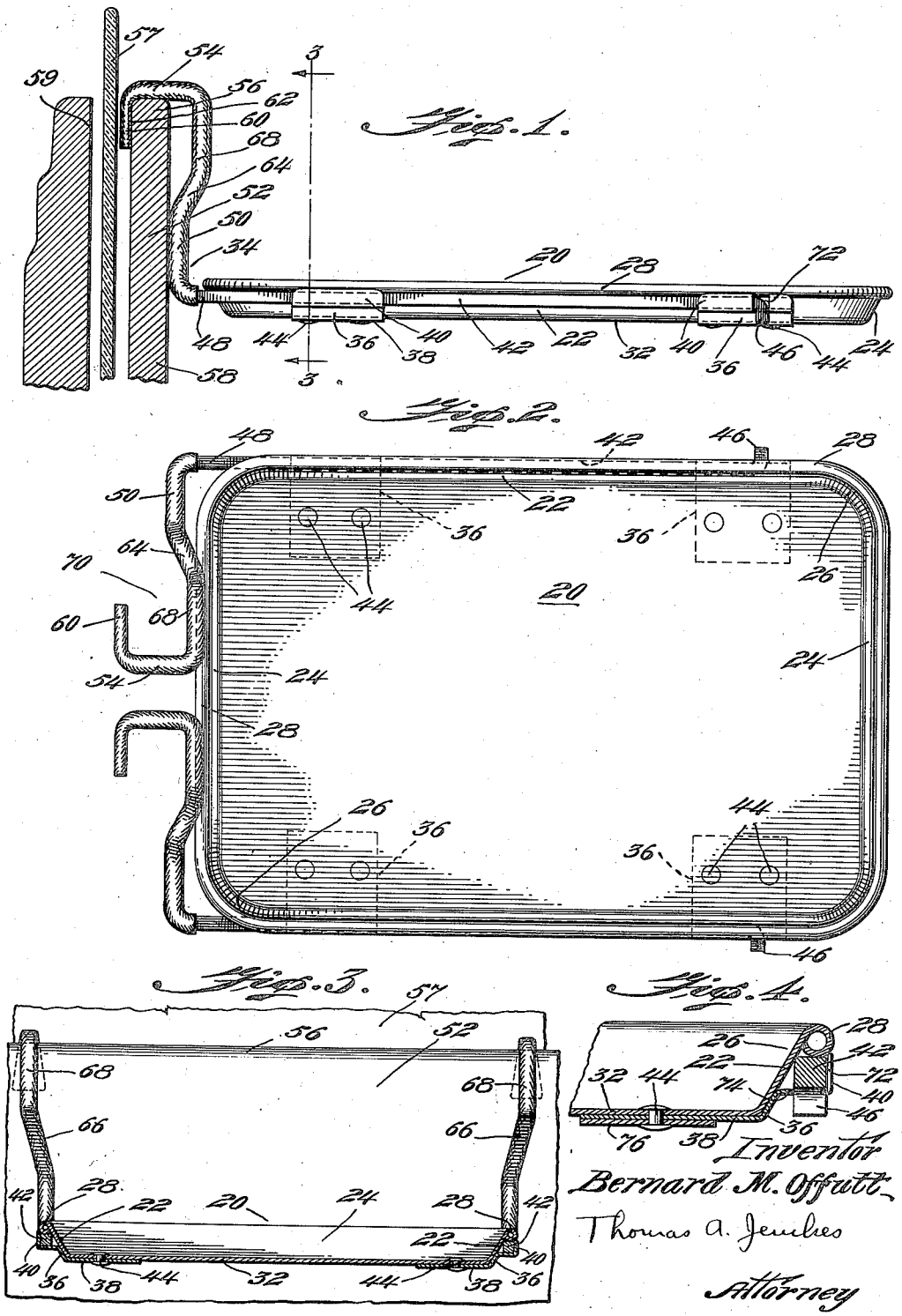

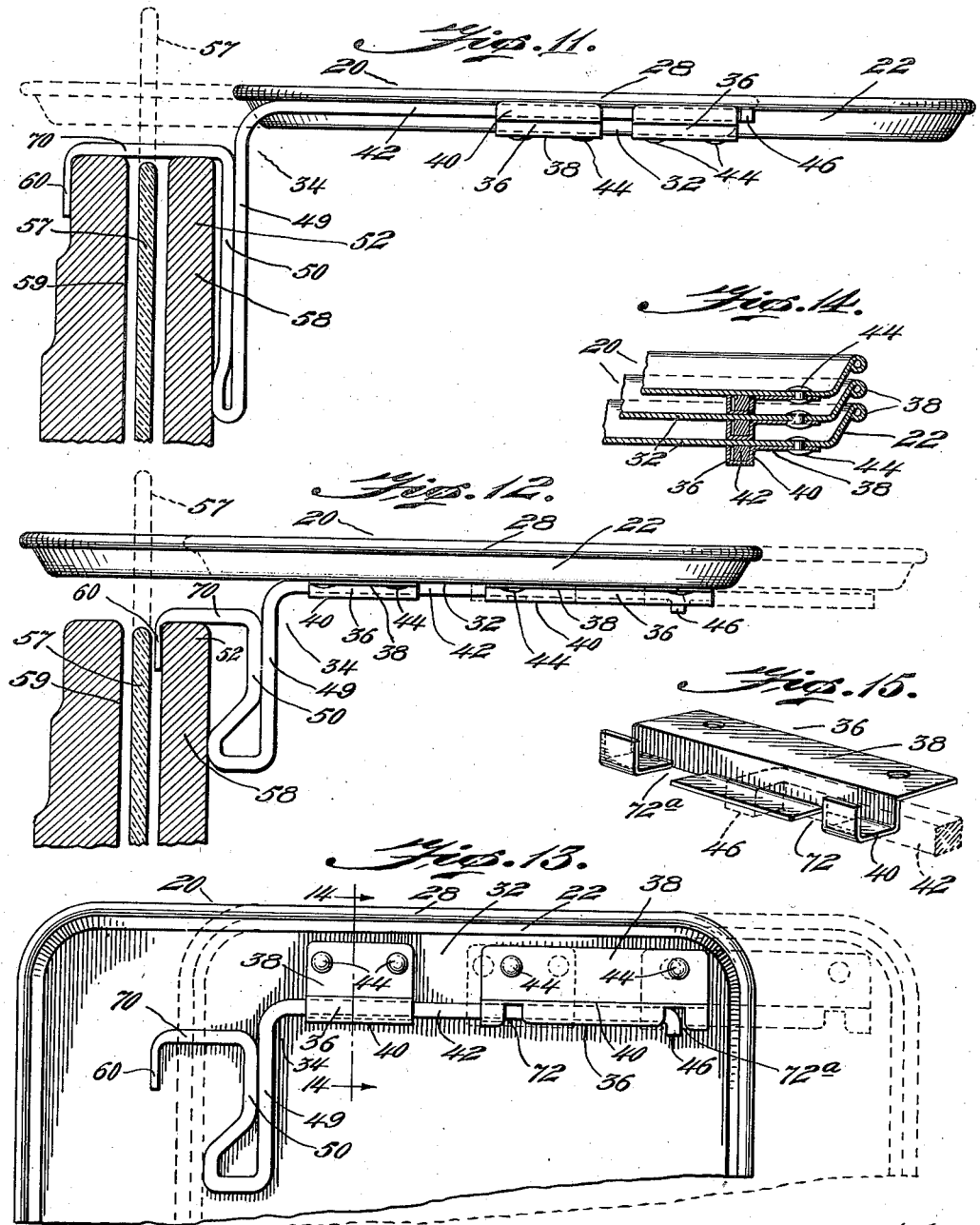

Patented Dec. 7, 1937

2,101,686

UNITED STATES PATENT OFFICE 2,101,686

SERVICE TRAY

Bernard M. Offutt, West Barrington, R. I.

Application May 17, 1935, Serial No. 22,008

14 Claims. (Cl. 311—22)

My invention relates to improvements in service trays, particularly of a type adapted for use in serving food or liquid nourishment to the occupants of an automobile or other vehicle.

My improved tray may be either a part of a standard equipment of an automobile to be carried around by the owner thereof for use in picnicking, etc. as he sees fit and is particularly adapted for this purpose as it may be rested flat on the knees, or on the ground for picnicking, or may be readily mounted in any desired position over or adjacent to a door, or window, or it may be sold to drug stores, bars, or stands dispensing solid or liquid refreshment to automobiles and it is particularly desirable for use for this latter purpose as my improved tray provides a tray which may be laid flat on any object so as to be readily loaded and which may be readily and quickly applied to an open or closed automobile and if desired to such a position inside the automobile that the window may be opened or closed without interference therewith and due to its inherent construction may be readily stacked into piles with the distances between vertically adjacent portions of said trays less than the depth of each tray.

An object of my invention is to provide a service tray of this description without any legs or other protuberances at the base or sides thereof to catch in the user's clothes, or to interfere with their stacking. My improved tray has a flat lower surface, whereby it may be rested on any flat object for loading purposes, or rested on the user's lap or on the ground without tending to tear his garments or be upset.

A further object of my invention is to provide a tray which may be readily stacked in compact piles.

A further object of an embodiment of my invention is to provide a suspension hook supporting means to bring the tray when attached to a door of an automobile to an accessible position nearer the user's lap below the level of its point of suspension and in certain forms of my invention in such a manner that the automobile window may be readily raised or lowered while my improved tray is attached. It is apparent that with the use of my improved suspension hook means that the tray will be suspended in a readily accessible and convenient position for eating or drinking therefrom.

A further feature of my invention is to provide a tray which may be readily attached on top of a door or to the inside or outside of the door or window sill which will provide a construction strong and compact enough to hold the desired number of contents without tipping.

A further feature of my invention is that by means of my improved hook suspension means, I am enabled to provide a substantially rigid mounting with widely spaced apart points of suspension.

A further feature of an embodiment of my invention resides in the fact that I am enabled to provide an improved construction wherein the improved attaching or hook suspension means may be attached to the door or window sill or other support and the tray itself may be moved relative thereto from a position over said support to a position away from, either inside or outside, of said support.

Further features of my invention relate to the simple structure thereof employing merely a standard tray preferably one with inclined side and end walls, preferably flaring outwardly and upwardly and terminating in a rigid bead and in one embodiment of my invention with my improved suspension hook means attached to the strongest part of the tray immediately adjacent to the bead.

A further feature of my invention is to provide an improved service tray which merely consists of a standard tray and improved suspension or attaching means therefor constructed out of standard flat, square, or round stock with a minimum number of pressing and bending operations.

These and such other objects of my invention as may hereinafter appear will be best understood from a description of the accompanying drawings, which illustrate various embodiments thereof.

In the drawings, Fig. 1 is a side elevation of the improved embodiment of my invention mounted on the inside portion of the window well of an automobile door, the parts of the door being shown in section, and with my improved suspension hook means in operative attaching position.

Fig. 2 is a plan view of my improved service tray shown in Fig. 1 with the hook means pivoted to a closed position for stacking.

Fig. 3 is a sectional view taken along the line 3—3 of Fig. 1, showing how my improved embodiment is mounted on the adjacent automobile door shown in elevation.

Fig. 4 is a transverse sectional view taken through a portion of a tray constructed in accordance with my invention adjacent and through the side wall thereof.

Fig. 5 is a perspective view of the improved supporting means I employ in the embodiment of my invention shown in Figs. 1-7.

Fig. 6 is a side view of a plurality of stacked trays with the attaching means pivoted to a closed stacking position.

Fig. 7 is a sectional view through a plurality of stacked trays taken along the line 7—7 of Fig. 6.

Fig. 8 is a plan view of substantially one-half of a tray showing a modified form of my invention, in which the shank supporting means are constructed out of round stock and the shank holding means are mounted on the upper surface of the flaring side walls.

Fig. 9 is a sectional view similar to Fig. 3, looking towards the inside face of an automobile door of the embodiment of my invention shown in Fig. 8.

Fig. 10 is a transverse sectional view taken through a tray side wall and adjacent tray portion along the line 10—10 of Fig. 8.

Fig. 11 is a side elevation of an alternative embodiment of my invention in which the hook is of such a width that it may be attached over the complete thickness of the door, the supporting means being on a level below that of the tray and in which the supporting means and tray have relative sliding movement to slide the tray from a position inside the door to a position over the door as shown in dotted lines.

Fig. 12 is a side elevation of a still further embodiment of my invention, in which the shanks of the supporting means are mounted underneath the tray instead of underneath the inclined side walls thereof and in which also the tray is slidable from a position over the door as shown in dotted lines to a position away from the door.

Fig. 13 is a reverse plan view of a portion of the embodiment of my tray shown in Fig. 12 with the improved clamping means pivoted to a flat position underneath the tray for stacking purposes.

Fig. 14 is a fragmentary detailed sectional view similar to Fig. 7 showing portions of stacked trays constructed in accordance with the embodiment of my invention shown in Figs. 12 and 13.

Fig. 15 is a perspective view of the shank holding means for securing the shanks of the attaching means to the base of the tray in the embodiment of my invention shown in Figs. 12-14.

In the drawings, wherein like characters of reference indicate like parts throughout, 20 generally indicates a curb service tray constructed in accordance with my invention.

My improved service tray is provided with the side walls 22 and with the end walls 24 preferably flared upwardly and outwardly as at 26 and terminating in a rolled over bead 28, and is of a standard type of service trays on the market today.

As shown, my complete tray unit has a substantially flat lower surface 32 so substantially flat that it will rest solidly on an object for loading purposes and will permit a plurality of said trays to be vertically stacked in a small compass.

My invention consists in providing in combination with a standard type of tray, supporting means of the manner described, in my preferred embodiment, of the suspension hook type 34 preferably mounted on said tray, one being mounted on each side wall 22 thereof pivotal from a substantially vertical position for mounting of said tray on the support edge to a position such that said trays may be stacked with the distance between vertically adjacent portions of said trays less than the depths of said trays.

The different embodiments shown in the drawings illustrate alternative types of said supporting means. I have shown in Figs. 1-11, the preferred embodiments of my invention wherein each supporting means is preferably pivotally mounted on each tray side wall 22, although if desired they may be mounted on the base 32 thereof as in the embodiments shown in Figs. 12-14 as a tray unit having a substantially flat lower surface within the purviews of my invention and a unit which will stack substantially within the same compass. I also provide shank holding means 36 having a portion 38 thereof secured to said tray and another portion 40 thereof extending around said shank to mount the shank 42 of said supporting means to the embodiments shown in Figs. 1-11 underneath the bead 28 and inclined side walls 22 of the tray proper or in the embodiments of my invention shown in Figs. 12-15 underneath the lower surface 32 of said tray. In the embodiments shown I preferably secure said portion 38 of said supporting means to its respective tray portion by means of the rivets 44.

In the various embodiments shown the supporting means 34 comprises the shank portions 42 adapted to extend longitudinally of said tray, in my preferred embodiment shown in Figs. 1-11 underneath the inclined side walls 22 thereof and the embodiments shown in Figs. 12-15 underneath the lower surface 32 thereof. Said shank portions 42 terminate in the inner ends 46 projecting at right angles therefrom. Each shank portion 42 also has a hook portion projecting outwardly as at 48, in the embodiments of my invention shown in Figs. 1-10 from the outer end of said tray, shaped when pivoted to operative position to extend vertically upwardly a substantial distance as at 50 to abut the vertical support face 52, then outwardly as at 54 for overhanging engagement with the upper end 56 of said support 58 and terminating in the downwardly extending end 60 forming a clamping end engaging an edge 62 of a window well or other support. In my preferred embodiment, shown in Fig. 1 intermediate the portions 50 and 54 of said hook, I bend the hook portion first inwardly as at 64 and preferably also laterally as at 66 and then upwardly as at 68 for purposes to be more fully described.

Said hooked supporting means 34 are preferably so pivotally mounted on the tray in the manner heretofore described that they may be pivoted inwardly substantially 90° to the closed position shown in Figs. 2, 6, 8 and 13 to abut, in the preferred embodiment shown in Figs. 1-10 the upper surface of the outer tray end wall 24 to permit a close stacking of said trays. In the embodiment shown in Figs. 1-10 the hooked portions 70 are bent inwardly as at 64 so that the hooks may be more readily engaged around the upper end 56 of the support 58 and bent laterally as at 66 so as to space more broadly the points of pivotal support of the tray to prevent it from any lateral sway and also in closed position to raise the portions 68 above the portions 50 so that they may abut and rest upon the bead 28 of the outer end wall 24 of the tray 20. In these embodiments the inner end 46 of the shank portion 42 is bent downwardly at right angles therefrom and the shank holding means 36 has the shank surrounding portion 40 provided with the vertical slot 72 therein to permit pivotal movement of said shank end 46 and prevent longitudinal movement of said shank 42, said slot 72 being provided with an edge (in the embodiment shown a lower edge) 74 to limit the downward movement of said inner shank end 46 and assist in retaining its respective hook means 70 in a substantially vertical operative position and against any lateral sway. In the embodiment shown in Figs. 1–7, the shank 42 is preferably made square as shown and the shank holding means 36 has the portions 38 thereof secured by the rivets 44 to the base of the tray and the shank holding portions 40 resilient and lying underneath said bead 28 and inclined tray side wall 22. It is thus obvious that with this construction of the resilient portion 40 functioning against the square shank that pressure on the shank may pivot it at right angles and that the resilient portion 40 of the holding means once the shank has passed its dead center will tend to hold it in either an open or closed position. As shown in Fig. 4, if desired, the plate 76 may be attached underneath the tray attaching portion 38 to serve as a reenforcement.

In the embodiment shown in Figs. 8–10 the shank portion 42 is preferably made round and the tray attaching portions 38 of the shank holding means 36 are attached over the inclined side walls 22 and suitably secured thereto by the rivets 44, the shank holding portions 40 depending therefrom around the shank 42.

I have shown in Figs. 11–15, embodiments of my invention which may be constructed to be attached over the top of a support and preferably embodiments of my invention wherein the supporting means 34 and tray 20 are movable relative to each other so that the tray 20 may be moved from a position over the support 58 to a position away from said support 58. In the embodiment shown in Fig. 11 the hook means 70 as shown may be made of a width to straddle an entire automobile door instead of merely straddling the inner wall 58 of the well. In the embodiment of my invention shown in Fig. 11 the inner end 46 of the shank 42 terminates inside of the inner shank attaching means 36 and the shank holding means 36 is attached so loosely around the shank that the tray 20 may be moved from a position shown in full lines with the inner end 46 of the shank abutting the inner end of the inner shank attaching means 36 to the position shown in dotted lines with the outer end of the outer shank attaching means abutting the inner surface of the depending portion 49 of said shank. In the embodiment of my invention shown in Figs. 11–15 the shank first bends downwardly as at 49 and may or may not project outwardly as at 48 in the other embodiments of said tray 20 prior to its being bent upwardly as at 50. It is thus obvious that with this construction the tray 20 may be relatively moved or slid over the hook portion 70 in such a manner that the tray portion may cover the support 52 or may be moved away therefrom to permit the window 57 of the automobile window well 59 to be closed without interfering with the operation of the tray.

I have shown in Figs. 12–14 an embodiment of my invention wherein the shank holding means are attached to the lower portion 32 of the tray instead of to the side walls 22 thereof and in which the hook portion 70 preferably bends downwardly as at 49 prior to being formed into the hook. In this embodiment of my invention the shank holding portion 40 of the inner shank holding means 36 is provided with two spaced slots 72 and 72ª to permit the end 46 when in horizontal position to be moved from the inner slot 72 to the slot 72ª as the tray is moved from a position over said hook 70 to a position inside of said hook 70 and support 58.

As is apparent from the description of the drawings all embodiments of my tray will be spaced apart merely the thickness of the shank 42 plus its holding portions 36. Thus as shown in Fig. 7 where the shank is located underneath the bead 28 in the side walls 22, the bead of the lower trays will rest underneath the shank 42 and holding portions 36 of the tray immediately above it and thus space the trays vertically apart less than their individual depths. As shown in the embodiment in Figs. 12–15 the trays are correspondingly spaced apart the thickness of the shank 42 and the shank holding means 36, which in this instance may depend slightly from the lower surface 32. It is apparent therefore that 20 either embodiment will permit a more close stacking of the trays than has been possible heretofore, resulting in a stacking considerably less than the depths of the individual trays.

While I have shown my improved tray 20 as being made of pressed metal and the supporting means 34 and shank holding means 36 as constructed respectively of bent wire, or square stock and sheet metal, it is apparent that the tray part of my invention may be constructed of any suitable material, such as metal, pulp, any plastic material, such as rubber, formaldehyde condensation products, etc. without departing from the scope of my invention as set forth in the appended claims.

It is apparent therefore that I have provided a novel type of service tray constructed of a minimum number of simple parts, positive in its action and with the advantages explained above.

It is understood that my invention is not limited to the specific embodiments shown and that various deviations may be made therefrom without departing from the spirit and scope of the appended claims.

What I claim is:

1. A curb service tray having a substantially flat lower surface to rest solidly on an object for loading purposes and upwardly and outwardly flaring side and end walls and spaced hook means projecting from one end only of said tray each having a shank portion of less height than each side wall pivotally mounted on each respective side wall and a hook portion projecting outwardly from an end of said tray shaped when pivoted to operative position to extend first upwardly to abut a wall of a support then outwardly for overhanging engagement with the upper end of said support and terminating in a downwardly extending end forming a clamping end for engaging an edge of a window well or other support, each hook portion being of a length to hold said tray in a horizontal position on said support and adapted when pivoted inwardly to a closed position to lie substantially in the plane of said tray to permit a close telescopic stacking of said trays.

2. A curb service tray having a substantially flat lower surface to rest solidly on an object for loading purposes and upwardly and outwardly flaring side and end walls and spaced hook means projecting from one end only of said tray each having a shank portion of less height than each side wall pivotally mounted on each respective side wall and a hook portion projecting outwardly from an end of said tray shaped when pivoted to operative position to extend first upwardly vertically a substantial distance to abut a support edge, then laterally and inwardly, then upwardly, then outwardly for overhanging engagement with the upper end of said support, each hook portion being of a length to hold said tray in a horizontal position on said support and terminating in a downwardly extending end forming a clamping end for engaging an edge of a window well or other support and adapted when pivoted inwardly to a closed position to abut the upper tray edge to permit a close telescopic stacking of said trays.

3. A curb service tray having a base having an under surface having upwardly extending edges and a substantially flat portion interiorly of said upwardly extending edges to rest solidly on an object for loading purposes and hook supporting means each having a square shank portion extending longitudinally of and pivotally mounted underneath the under surface of said tray terminating in an inner end projecting downwardly at right angles therefrom and a suspension hook portion projecting outwardly from an end of said tray shaped when pivoted to operative position to extend outwardly for overhanging engagement with the upper end of said support and terminating in a downwardly extending end forming an end for engaging an edge of a window well or other support and adapted when pivoted inwardly to a closed position to abut the upper tray edge to permit a close stacking of said trays, and resilient shank holding means having a portion thereof secured to the undersurface of said tray and another portion extending around said shank and having a vertical slot therein to permit pivotal movement of said shank end and prevent longitudinal movement of said shank and further having a lower edge to limit the downward movement of said inner shank end and assist in retaining its respective hook means in a substantially vertical operative position and against any lateral sway, said tray and suspension hook means being movable relative to each other to position said tray from a position over said support to a position away from said support.

4. A curb service tray having a base having an under surface having upwardly extending edges and a substantially flat portion interiorly of said upwardly extending edges to rest solidly on an object for loading purposes and hook supporting means each having a shank portion extending longitudinally of the under surface of said tray terminating in an inner end projecting at right angles therefrom and a hook portion projecting from said tray shaped when pivoted to operative position to extend vertically upwardly a substantial distance to abut a vertical support edge, then outwardly for overhanging engagement with the upper end of said support and terminating in a downwardly extending end forming an end for engaging an edge of a window well or other support and adapted when pivoted inwardly to a closed position to abut the upper tray edge to permit a close stacking of said trays, and shank holding means having a portion thereof secured to said tray and another portion extending around said shank and having a vertical slot therein to permit pivotal movement of said shank, said slot having an edge to limit the downward movement of said inner shank end and assist in retaining its respective hook means in a substantially vertical operative position and against any lateral sway.

5. A curb service tray having a base having an under surface having upwardly extending edges and a substantially flat portion interiorly of said upwardly extending edges to rest solidly on an object for loading purposes and hook supporting means each having a shank portion extending longitudinally of and pivotally mounted underneath the under surface of said tray terminating in an inner end projecting at right angles therefrom and a hook portion projecting from said tray shaped when pivoted to operative position to extend vertically upwardly a substantial distance to abut a vertical support edge, then laterally and inwardly, then upwardly and then outwardly for overhanging engagement with the upper end of said support and terminating in a downwardly extending end forming an end for engaging an edge of a window well or other support and adapted when pivoted inwardly to a closed position to abut the upper tray edge to permit a close stacking of said trays, and shank holding means having a portion thereof secured to said tray and another portion extending around said shank and having a vertical slot therein to permit pivotal movement of said inner shank end and prevent longitudinal movement of said shank, said slot having an edge to limit the downward movement of said inner shank end and assist in retaining its respective hook means in a substantially vertical operative position and against any lateral sway.

6. A curb service tray having a base having an under surface having upwardly extending edges and a substantially flat portion interiorly of said upwardly extending edges to rest solidly on an object for loading purposes and hook supporting means each having a square shank portion extending longitudinally of and pivotally mounted underneath the under surface of said tray terminating in an inner end projecting at right angles therefrom and a hook portion projecting from said tray shaped when pivoted to operative position to extend vertically upwardly a substantial distance to abut a vertical support edge, then laterally and inwardly, then upwardly and then outwardly for overhanging engagement with the upper end of said support and terminating in a downwardly extending end forming an end for engaging an edge of a window well or other support and adapted when pivoted inwardly to a closed position to abut the upper tray edge to permit a close stacking of said trays, and resilient shank holding means having a portion thereof secured to the under surface of said tray and another portion extending around said shank and having a vertical slot therein to permit pivotal movement of said shank, said slot having an edge to limit the downward movement of said inner shank end and assist in retaining its respective hook means in a substantially vertical operative position and against any lateral sway.

7. A curb service tray having a base having an under surface having upwardly extending edges and a substantially flat portion interiorly of said upwardly extending edges to rest solidly on an object for loading purposes and hook supporting means each having a shank portion extending longitudinally of and pivotally mounted underneath the under surface of said tray terminating in an inner end projecting at right angles therefrom and a hook portion projecting from said tray shaped when pivoted to operative position to extend vertically upwardly a substantial distance to abut a vertical support edge, then outwardly for overhanging engagement with the upper end of said support and terminating in a downwardly extending end forming an end for engaging an edge of a window well or other support and adapted when pivoted inwardly to a closed position to abut the upper tray edge to permit a close stacking of said trays, and shank holding means having a portion thereof secured to the undersurface of said tray and another portion extending around said shank and having a vertical slot therein to permit pivotal movement of said inner shank end and prevent longitudinal movement of said shank, said slot having an edge to limit the downward movement of said inner shank end and assist in retaining its respective hook means in a substantially vertical operative position and against any lateral sway.

8. A curb service tray having a base having an under surface having upwardly extending edges and a substantially flat portion interiorly of said upwardly extending edges to rest solidly on an object for loading purposes and hook supporting means each having a square shank portion extending longitudinally of and pivotally mounted underneath the under surface of said tray terminating in an inner end projecting at right angles therefrom and a suspension hook portion projecting from said tray shaped when pivoted to operative position to extend vertically upwardly a substantial distance to abut a vertical support edge then outwardly for overhanging engagement with the upper end of said support and terminating in a downwardly extending end forming an end for engaging an edge of a window well or other support and adapted when pivoted inwardly to a closed position to abut the upper tray edge to permit a close stacking of said trays, and resilient shank holding means having a portion thereof secured to said tray and another portion extending around said shank and having a vertical slot therein to permit pivotal movement of said inner shank end and prevent longitudinal movement of said shank, said slot having an edge to limit the downward movement of said inner shank end and assist in retaining its respective hook means in a substantially vertical operative position and against any lateral sway.

9. A curb service tray having a base having an under surface having upwardly extending edges and a substantially flat portion interiorly of said upwardly extending edges to rest solidly on an object for loading purposes and hook supporting means each having a shank portion extending longitudinally of and pivotally mounted underneath the under surface of said tray terminating in an inner end projecting downwardly at right angles therefrom and a suspension hook portion projecting outwardly from an end of said tray shaped when pivoted to operative position to extend vertically upwardly a substantial distance to abut a vertical support edge then outwardly for overhanging engagement with the upper end of said support and terminating in a downwardly extending end forming an end for engaging an edge of a window well or other support and adapted when pivoted inwardly to a closed position to abut the upper tray edge to permit a close stacking of said trays, and shank holding means having a portion thereof secured to said tray and another portion extending around said shank and having a vertical slot therein to permit pivotal movement of said inner shank end and prevent longitudinal movement of said shank, said slot having a lower edge to limit the downward movement of said inner shank end and assist in retaining its respective hook means in a substantially vertical operative position and against any lateral sway.

10. A curb service tray having a base having an under surface having upwardly extending edges and a substantially flat portion interiorly of said upwardly extending edges to rest solidly on an object for loading purposes and hook supporting means each having a shank portion extending longitudinally of and pivotally mounted underneath the under surface of said tray terminating in an inner end projecting at right angles therefrom and a hook portion projecting from said tray shaped when pivoted to operative position to extend vertically downwardly then vertically upwardly a less distance to abut a vertical support edge, then outwardly for overhanging engagement with the upper end of said support and terminating in a downwardly extending end forming an end for engaging an edge of a window well or other support and adapted when pivoted inwardly to a closed position to abut the upper tray edge to permit a close stacking of said trays and shank holding means having a portion thereof secured to said tray and another portion extending around said shank having a vertical slot therein to permit pivotal movement of said inner shank end and prevent longitudinal movement of said shank having an edge to limit the downward movement of said inner shank end and assist in retaining its respective hook means in a substantially vertical operative position and against any lateral sway, said tray and suspension hook means being movable relative to each other to position said tray from a position over said support to a position away from said support.

11. A rectangular curb service tray having a base having an under surface having upwardly extending and outwardly flaring side and end edges terminating in a rolled over bead and a substantially flat portion interiorly of said upwardly extending and outwardly flaring edges, whereby a plurality of said trays may be telescopically stacked and spaced supporting means each having a rigid shank portion of less height than said edges pivotally mounted on the upper portions of the under surfaces of said upwardly extending and outwardly flaring tray side edges and a hook portion projecting from one end only of said tray pivotable from a substantially vertical position for horizontal mounting of said tray on a support edge to a horizontal position so that said trays may be stacked in partially nested relationship with the distances between vertically adjacent portions of said trays less than the depths of said trays.

12. A curb service tray having a base having an under surface having upwardly extending edges and a substantially flat portion interiorly of said upwardly extending edges, whereby a plurality of said trays may be telescopically stacked and spaced supporting means each having a rigid shank portion of less height than said edges pivotally mounted on the under surface of said tray, and a hook portion projecting from one end only of said tray pivotable from a substantially vertical position for horizontal mounting of said tray on a support edge to a horizontal position so that said trays may be stacked with the distances between vertically adjacent portions of said trays less than the depths of said trays, said tray and said supporting means being movable relative to each other to position said tray from a position over said support to a position away from said support.

13. A rectangular curb service tray having a base having an under surface having upwardly extending and outwardly flaring side and end edges terminating in a rolled over bead and a substantially flat portion interiorly of said upwardly extending and outwardly flaring edges, whereby a plurality of said trays may be telescopically stacked and spaced suspension hook supporting means each having a rigid shank portion of less height than said edges pivotally mounted on the upper portions of the under surfaces of said upwardly extending and outwardly flaring tray side edges and a hook portion projecting from one end only of said tray pivotable from a susbtantially vertical position for horizontal mounting of said tray on a support edge to a horizontal position so that said trays may be stacked in partially nested relationship with the distances between vertically adjacent portions of said trays less than the depths of said trays.

14. A rectangular curb service tray having a base having an under surface having upwardly extending and outwardly flaring side and end edges terminating in a rolled over bead and a substantially flat portion interiorly of said upwardly extending and outwardly flaring edges, whereby a plurality of said trays may be telescopically stacked and spaced supporting means each having a rigid shank portion of less height than said edges pivotally mounted on the under surface of said tray side edges and a hook portion projecting from one end only of said tray pivotable from a substantially vertical position for horizontal mounting of said tray on a support edge to a horizontal position so that said trays may be stacked with the distances between vertically adjacent portions of said trays less than the depths of said trays, said tray and said supporting means being movable relative to each other to position said tray from a position over said support to a position away from said support.

BERNARD M. OFFUTT.